July 31, 1956 J. LATZEN 2,757,015
DOUBLE JOINT FOR VEHICLE STEERING GEAR
Filed Aug. 20, 1953
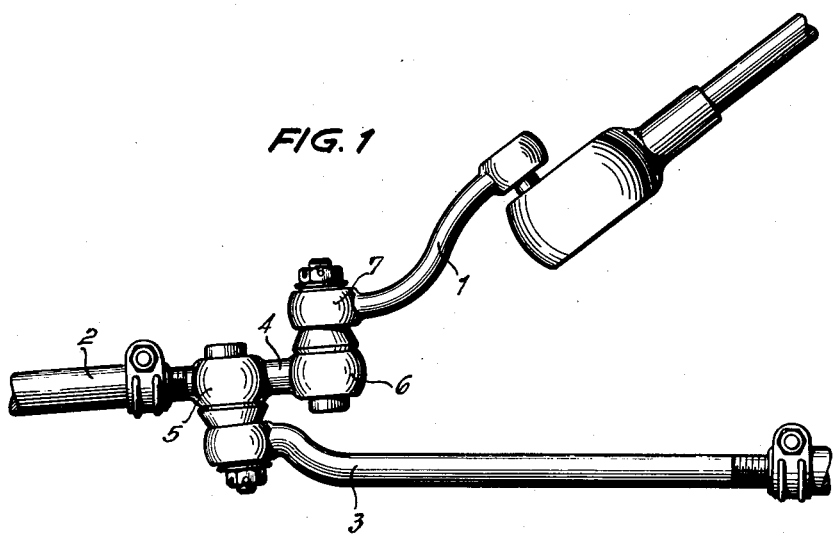
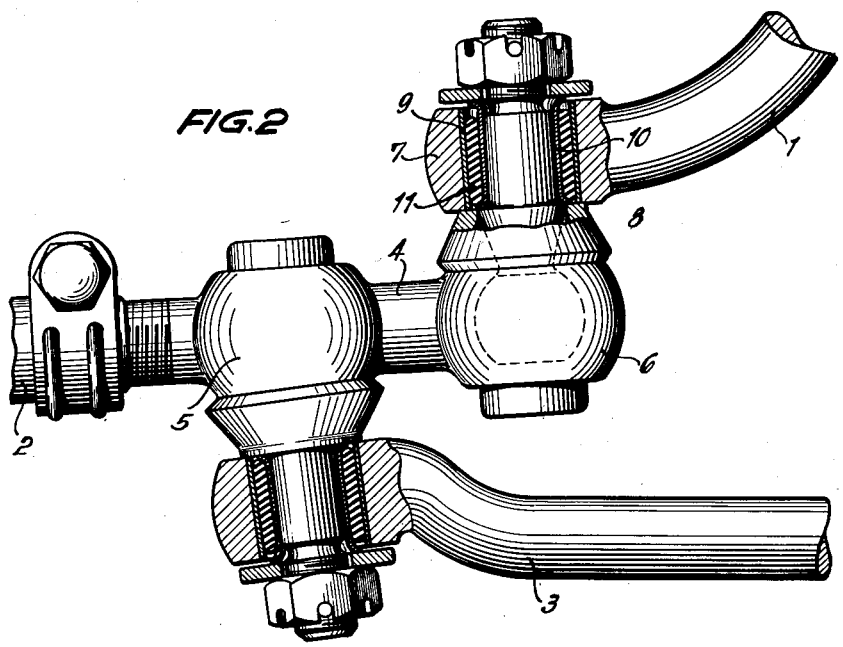
INVENTOR
JOSEF LATZEN
BY Robert H. Jacob
AGENT _United States Patent Office_

2,757,015
Patented July 31, 1956

2,757,015
DOUBLE JOINT FOR VEHICLE STEERING GEAR

Josef Latzen, Dusseldorf-Oberkassel, Germany, assignor to A. Ehrenreich & Cie

Application August 20, 1953, Serial No. 375,462

3 Claims. (Cl. 280—95)

This invention relates to a double joint for a vehicle steering gear, especially for the steering gear of a power vehicle, in which one part of the joint makes the connection between the drop arm and the one track rod or drag link and the other part of the joint makes the connection between the said one track rod or drag link and the other drag link or track rod. The object of the invention is to provide a double joint which, in addition to enabling compensation to be made for deviations from the kinematically determined conditions, also affords protection from the harmful effects of blows and angular deflecting stresses which would cause greater angular deflections than the parts of the joint can withstand.

The construction of single joints in the form of elastic joints is already known. Also, a proposal has been made, but not previously published, to provide a rubber lining between the pivot pin of the joint and the eye or socket in which the pin is mounted.

According to the present invention, an elastic cushioning is provided for both parts of the double joint. By this means, the transmission of shocks and angular deflecting stresses from any one of the three parts connected together by the double joint to another of the parts is minimised or prevented. Any shocks and angular deflecting stresses acting on the track rod or drag link cannot be transmitted either to the drop arm or to another part of the steering gear and vice versa.

In the double joint of the invention, both parts of the joint may be constructed as elastic joints. For this purpose, each part of the joint can be formed as an elastic joint in a similar manner to a single elastic joint, in that for example, the head of the pin of the joint rests in an elastic lining within the housing or socket of the joint.

Another possibility is to arrange both parts of the joints in such a manner that a rubber lining is provided between the pin of each joint and the eye of the lever mounted thereon. This form of construction of the invention has the advantage that each part of the joint can be formed as an unyielding steel ball joint, whereby a particularly light movement of the double-joint is maintained in spite of the provision of the elastic cushioning.

It is also possible to construct one part of the joint as an elastic joint and to provide an elastic lining or insertion between the pin of the joint and the eye of the lever in which the pin is mounted.

According to another possible form of construction, one or both of the joints are elastic joints and a rubber lining is provided for one or both of the joints between the pin of the joint and the eye of the lever in which the pin is mounted.

The invention is illustrated by way of example in the accompanying drawing, in which:

Fig. 1 shows a steering gear in plan view with the steering rod swung in the plane of the paper; and Fig. 2 shows a double-joint and its fixing means.

Referring to the drawing, the drop arm is indicated by the reference numeral 1, the long track rod by the reference numeral 2 and the drag link or short track rod by the reference numeral 3. The rod 2 and link 3 are connected to one another and to the drop arm by a double joint 4, each part 5 and 6 of which is in the form of a ball and socket joint. The part 6 makes the connection between the drop arm 1 and the long track rod 2 by way of a laterally extending arm on joint part 5 and the part 5 makes the connection between the track rod 2 and the drag link 3 which is connected to the pin of the joint. The double joint is fixed to the drop arm 1 by engaging the pin 8 of the ball of the joint part 6 in an eye or socket 7 in the drop arm 1. A rubber lining 11 disposed between two metal sleeves 9 and 10 is provided in the eye or socket 7. The joint part 5 is fixed in a similar manner to the drag link 3.

I claim:

1. Universally movable double joint link for steering gears presenting connection points for three gear components including a drop arm and a pair of track rods, said double joint link having a pair of adjacently disposed joint housings, each provided with a ball head receiving aperture on the side opposite the aperture of the other housing, a ball headed pin being disposed with its ball head in each said housing in a manner that said pins extend in opposite directions, one of said housings having a member extending laterally therefrom for rigidly securing one of said track rods thereto and said pin extending from said housing having said laterally extending member being pivotally connected to the other of said track rods and said other pin being connected to the drop arm of the steering gear.

2. Universally movable double joint link for steering gears presenting connection points for three gear components, said double joint link having a pair of adjacently disposed joint housings, each provided with a ball head receiving aperture on the side opposite the aperture of the other housing, a ball headed pin being disposed with its ball head in each said housing in a manner that said pins extend in opposite directions, one of said housings having a member extending laterally therefrom for rigidly securing one of said track rods thereto and said pin extending from said housing having said laterally extending member being pivotally connected to the other of said track rods and said other pin being connected to the drop arm of the steering gear, an elastic lining being disposed intermediate each of said oppositely extending pins and the cooperating socket on said other track rod and on said drop arm.

3. A vehicle steering gear, comprising, in combination, a drop arm, first and second track rods, a double joint unit including first and second sockets and first and second ball headed pins having their ball heads connected to said first and said second sockets, respectively, and having their pin portions extending in opposite directions from said sockets, said first socket presenting on one side thereof a member secured to said first track rod, and said second track rod being pivotally connected to the pin portion of said first ball headed pin, thereby constituting said first socket a pivot intermediate the ends of said first and second track rods, and said first socket having a portion extending from the other side thereof freely supporting said second socket independently of the ends of said track rods, and said pin portion of said second ball headed pin extending from said second socket being engaged by said drop arm.

References Cited in the file of this patent

UNITED STATES PATENTS

| | | |
|---|---|---|
| 1,778,197 | Lord | Oct. 14, 1930 |
| 2,186,287 | Fuchs | Jan. 9, 1940 |
| 2,227,521 | Utz | Jan. 7, 1941 |
| 2,246,661 | Best | June 24, 1941 |
| 2,246,833 | Beemer | June 24, 1941 |
| 2,390,231 | Utz | Dec. 4, 1945 |
| 2,541,827 | Mosso et al. | Feb. 13, 1951 |
| 2,660,901 | Latzen | Dec. 1, 1953 |

FOREIGN PATENTS

| | | |
|---|---|---|
| 492,849 | Great Britain | Sept. 28, 1938 |